Oct. 26, 1943.  A. B. ST. HILAIRE  2,332,945
METHOD OF MANUFACTURING PHONOGRAPHIC DISKS
Filed June 29, 1940  6 Sheets-Sheet 1

INVENTOR
Albert B. St. Hilaire
BY
Pennie, Davis, Marvin, Edmonds
ATTORNEYS

Oct. 26, 1943.    A. B. ST. HILAIRE    2,332,945
METHOD OF MANUFACTURING PHONOGRAPHIC DISKS
Filed June 29, 1940    6 Sheets-Sheet 2

INVENTOR.
Albert B. St. Hilaire
BY
ATTORNEYS

Oct. 26, 1943.   A. B. ST. HILAIRE   2,332,945
METHOD OF MANUFACTURING PHONOGRAPHIC DISKS
Filed June 29, 1940   6 Sheets-Sheet 4

INVENTOR
Albert B. St. Hilaire
BY
ATTORNEYS

Oct. 26, 1943.   A. B. ST. HILAIRE   2,332,945
METHOD OF MANUFACTURING PHONOGRAPHIC DISKS
Filed June 29, 1940   6 Sheets-Sheet 5

INVENTOR
Albert B St. Hilaire
BY
ATTORNEYS

Patented Oct. 26, 1943

2,332,945

UNITED STATES PATENT OFFICE 2,332,945

METHOD OF MANUFACTURING PHONOGRAPHIC DISKS

Albert B. St. Hilaire, Paris, France; vested in the Alien Property Custodian

Application June 29, 1940, Serial No. 343,177

5 Claims. (Cl. 117—120)

This invention relates to the manufacture of phonographic disks, and has for its object certain improvements in the method of manufacturing coated phonographic disks; which may thereafter be used for recording and reproducing sound in a conventional manner.

It has been the practice heretofore to make direct recording phonographic disks by coating blanks, such as aluminum, zinc, paper cardboard, and the like, in the following ways: the disks, containing holes in their centers, are mounted on a rod with spacers between adjacent blanks. While the rod is horizontally disposed, the lower half of the disks is submerged in a body of coating composition. The rod is revolved, thereby coating the disks on both sides. The discs are then withdrawn from the body of coating composition, and the rotation is continued until the coating on the discs hardens to a sufficient extent; after which they are dried. According to another method, the blank discs are sprayed with the coating composition. In accordance with a third method, the coating composition is dropped onto the disks, near their centers, while they are rotated. This rotation tends to spread the coating composition laterally across the face of the disks. These three customary methods of coating discs leave much to be desired, because not one of the methods assures an even and smooth coating of uniform thickness; with the result that difficulties are encountered not only in the recordation of sound, but in its reproduction.

This, an uneven thickness of coating on the disks causes the cutting means employed in the recordation of sound to jump up and down when passing over uneven ridges or swirl marks, which in turn causes deep and shallow grooves that impair sound reproduction qualities. An uneven thickness of coating also results in uneven drying, and thus produces a non-homogeneous surface. Disks with an uneven coating usually have an undesirable scratch noise. From the viewpoint of economy, an uneven coating is objectionable because the thinnest portion of the coating must be sufficiently thick to record in, and the excess coating is therefore wasted. Uneven coatings also obscure defects in the disks, making inspection for serious imperfections difficult or well-nigh impossible.

As a result of my investigations, I have discovered improvements in the method of manufacturing phonographic disks that largely overcome the difficulties enumerated. In accordance with the practice of the invention, each blank disk may be given a smooth, even coating of substantially uniform thickness, such as has not heretofore been obtained on material of the thickness required for use in recording. This is accomplished in a manner radically different from the methods heretofore employed.

In the practice of the present invention, a series of blank discs are successively placed on a practically imperforate band, the band being wider than the disks so as to provide a substantial amount of uncovered band immediately around each disc resting thereon. The band and disks are passed horizontally at a uniform and steady rate of speed under a feeding hopper containing a suitable coating composition, such as lacquer, the hopper extending laterally across the disks and at least over a portion of the uncovered band beyond both sides of each disk.

The disks are maintained at a predetermined and uniform distance from the bottom of the hopper. Coating lacquer is steadily discharged from the hopper as the discs pass thereunder. The viscosity and the amount of coating lacquer discharged from the hopper are such as to completely fill the gap between the disks and the bottom of the hopper without flowing out of the side of the hopper counter to the direction of travel of the disks, so that a coating of substantially the thickness of the gap is evenly spread across the top surface of each disk as it leaves the hopper; while the portion of the band immediately surrounding each disk is coated to a thickness substantially equal to the combined thickness of the blank disc and its coating.

The coated disks embedded on the band are permitted to travel a sufficient distance to clear the hopper, after which they are separated from the coated portion of the band at its discharge end, and are then suitably dried.

In addition to the method outlined, the invention also contemplates a treatment of the blank discs with a wetting agent miscible with the lacquer while in transit on the band to condition the surfaces for the coating and to inhibit the formation of bubbles within the coating as it dries.

In addition, special steps are employed to separate the coated disks from the coated band, in such a manner as to separate the two coatings along the perimeter of the disks. To this end, the band is passed downwardly at its discharge end and the forward portion of each coated disk is projected in a horizontal direction so that the coating on that part of the band is automatically and progressively sheared or severed from the coating around the forward perimeter portion of the disk. The projection portion of the coated disk is gripped and the disk propelled forward at a speed somewhat greater than that of the traveling band, to separate the two coatings along the perimeter of the rear portion of the coated disk.

A substantially constant supply of coating lacquer is maintained in the feed hopper which is sufficient in amount to provide enough hydraulic pressure to straighten out slight bends in the disks as they travel on the band under the hopper. This insures an even coating of substantially uniform thickness across the top of the disks as they emerge from under the hopper and then tend to assume their original slightly bent condition.

These and other features of the invention will be better understood by referring to the attached drawings, taken in conjunction with the following description, in which.

The apparatus shown comprises a pair of phonographic disk coating machines 10 and 11 disposed at opposite sides of the charging end of a drying tunnel 12. The coating machine, see Fig. 1, comprises a frame 13 in which a roll of band paper 14 is appropriately supported. A band 15 extends upwardly from the roll, around a pair of round tension bars 16 and 17, thence horizontally across the top of a table 18 to the other end of the frame, around a pair of appropriately supported rollers 19 and 20; and then laterally under the table and across a scraper blade 21, between a pair of driving rollers 22 and 23 to a take-up roll 24.

Figure 1:
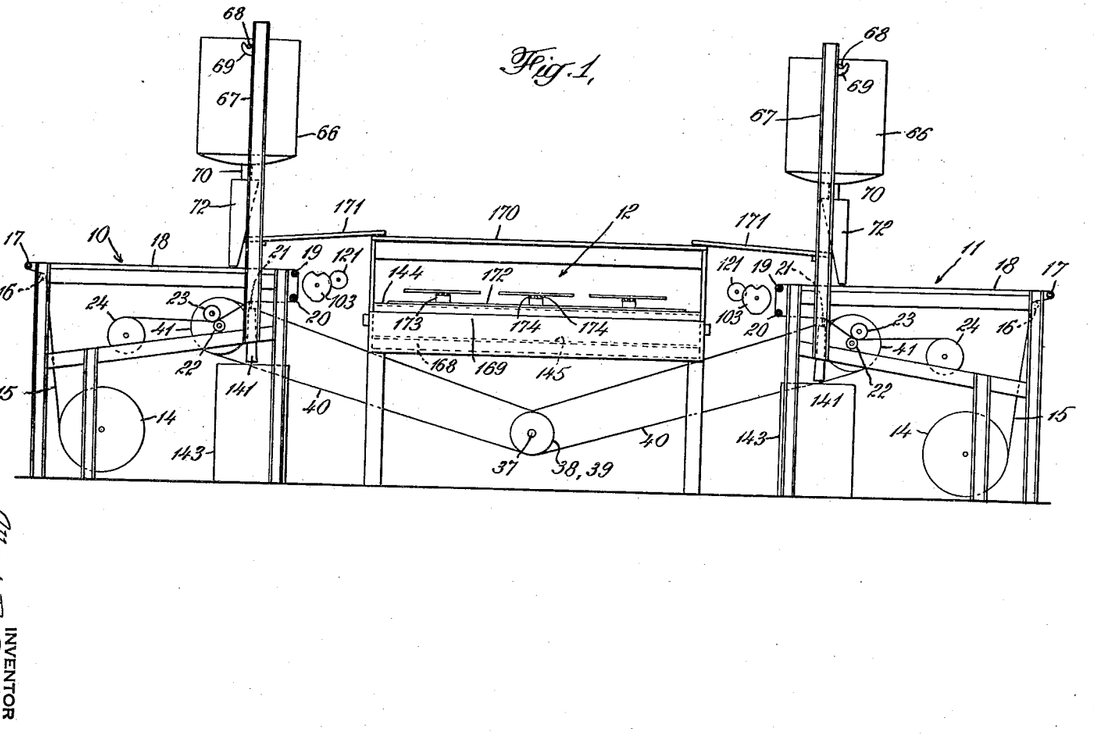
Fig. 1 is a diagrammatic front view of an apparatus illustrative of a practice of the invention.

Driving rollers 22 and 23 are appropriately geared to form a positive drive through roller 23; these two rollers, when in gear, are adapted to pull the band 15 from the roll 14, across the table top 18 and the scraper blade 21.

A pulley 43 is mounted on the shaft 42 and is fitted with a driving belt 44 connecting with a pulley 45 attached to a shaft 46 which drives the band take-up roll 24. Provision is made for taking care of the slippage that occurs in the operation of belt 44 around pulley 45, because of the varying diameter of the take-up roll 24 as the band 15 unwinds from the fresh roll of paper 14. This consists of a lever 47 pivoted at 48 to a cross member 49 on the frame 13. One end of the lever is provided with a roller 50 adapted to place the lower portion of the belt 44 under tension as a weight 51 attached to the other end of the lever forces that end of the lever downwardly.

In order to stop the travel of the paper band 15 in case of emergency, or for any other reason, the apparatus shown is provided with a bifurcated lever 52, extending under shaft 55 on which the upper roller 23 is mounted, and pivoted at point 53 to a plate 54 attached to the cross member 49. The upper end of the lever rests on a crank arm 56 pivoted at point 57 to a top cross-frame member 58. A handle 59 is attached to the crank arm. By moving the crank approximately 180°, the lower portion of the lever is lifted, and this in turn raises the driving roll 23 against a compression spring 60, thereby disengaging driving rolls 23 and 22. When this occurs, movement of the paper band 15 ceases, because the slippage of belt 44 is so great as not to rotate the take-up roll 24.

Tension bar 16 is permanently affixed at both ends to the frame, whereas tension bar 17 is fixed at one end and is adjustable with respect to the table 18 at the other end by means of an adjusting screw 61. Roller 19 is permanently affixed to the frame at the other end of the table 18, whereas roller 20 is self-centering so that the paper band is centered as it leaves the roller 19 and is taken up on the roll 24. For this purpose roller 20 is mounted in a U-shaped frame 62, at the center of which an upright stud 63 is attached. The stud is in turn mounted in a bearing 64 suitably attached to the cross member 65 of the frame.

Figures 2, 3:
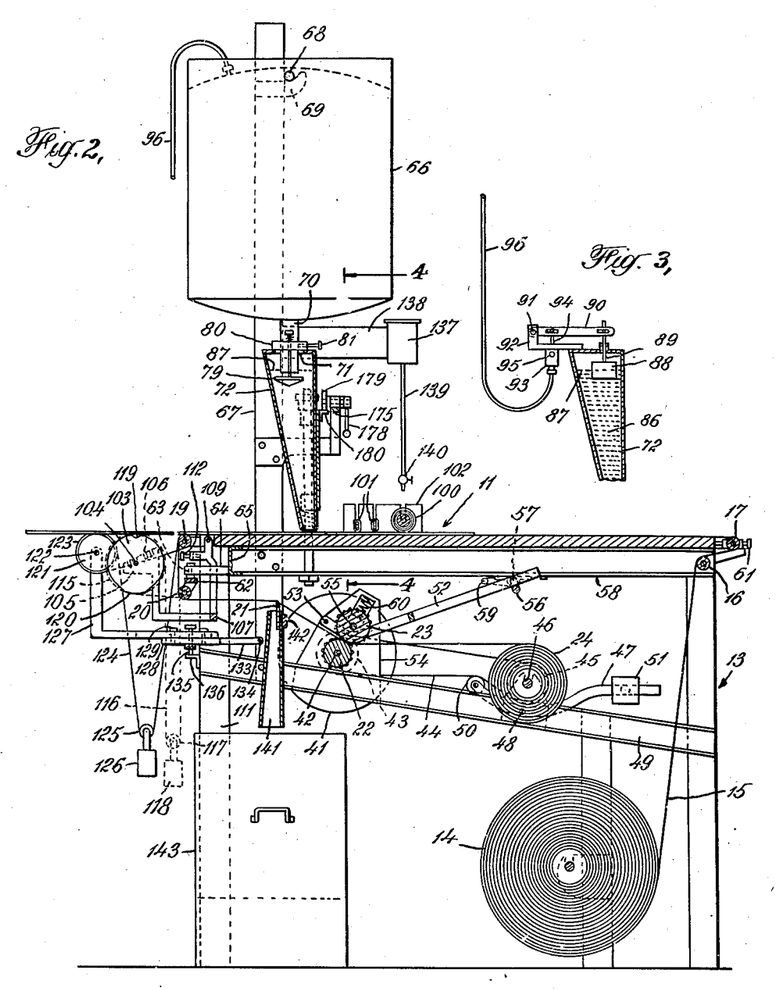
Fig. 2 is an enlarged sectional elevation of the coating machine shown in Fig. 1.
Fig. 3 is a sectional detail on the line 3—3 of Fig. 4 of the top of the feed hopper of the coating machine.
Figure 4:
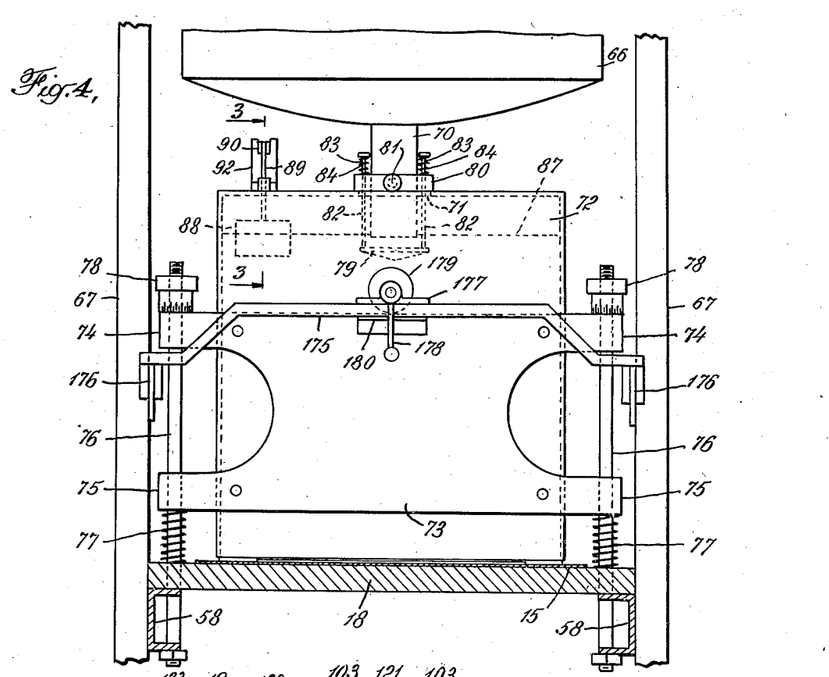
Fig. 4 is a section on the line 4—4 of Fig. 2.
Figure 5:
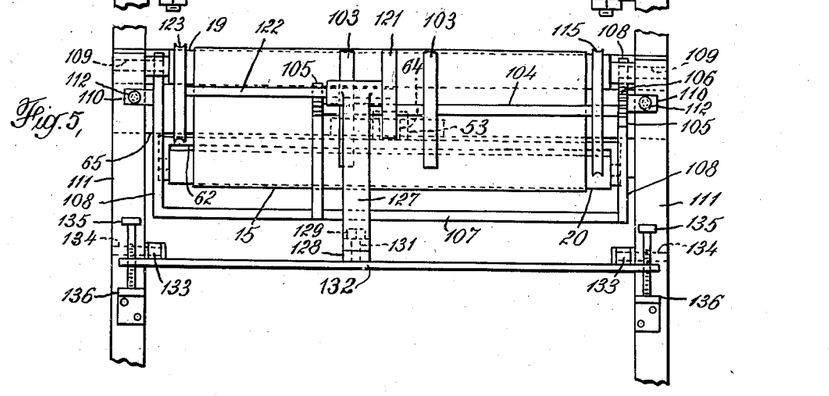
Fig. 5 is a partial end elevation of the coating machine shown more particularly in Fig. 2.

The feeding means, see Figs. 2 and 4, for the coating liquid comprises a container 66 appropriately supported on a pair of uprights 67 suitably attached to the cross members 49 and 58 of the frame. The container is provided with lugs 68 adapted to fit onto the top of brackets 69 attached to the uprights. The discharge end of the container is provided with a spout 70 projecting through an opening 71 in a feed hopper 72. The rear of the hopper is provided with a cross plate 73 having an upper and a lower pair of lugs 74 and 75 at its sides through which a pair of rods 76 extend, the lower ends of the rods being mounted in and supported by the frame members 58. Each rod 76 is provided with a compression spring 77 mounted between the table 18 and the lower lugs 75. The upper ends of the rods are provided with micrometric screws 78, so that the bottom of the hopper may be accurately spaced above the table 18.

Before mounting the container over the feed hopper, the opening of the spout 70 is covered with a closure 79 suitably attached to a collar 80 with a set screw 81 by means of a pair of rods 82 having extension portions 83 beyond the collar, the upper end of each being provided with a head to retain a compression spring 84 between it and the collar. After the spout 70 is pushed into the top of the feed hopper, the set screw 81 is loosened, and the collar 80 drops onto the top 85 of the feed hopper thereby closing the opening 71. The set screw is then tightened. This helps to seal the feed hopper against the entrance of dust and air; and helps to prevent evaporation of solvent in the coating liquid, such as lacquer 86.

In order to maintain a preferred lacquer level 87 in the feed hopper, see Fig. 3, the hopper is provided with a float 88 to which is attached a rod 89 extending through the top of the hopper; the outer end of the rod being secured to a lateral arm 90 pivoted at 91 to a bracket 92 secured to the top of the hopper. An air valve 93 is attached to the bracket, and the valve has a stem 94 attached to the lateral arm. The valve is provided with a port 95 for the entrance of air, and the lower end of the valve is connected with a tube 96, the other end of which fits into the top of the container 66. As the lacquer leaves the container 66 and passes into the feed hopper, a vacuum is set up in the upper portion of the container. In order to insure a free flow of lacquer from the container, it is important that this vacuum be broken at intervals. The instant construction permits the entrance of air into the top of the container when the lacquer is lowered to a certain level 87 within the feed hopper. When the float 88 reaches that level, the stem 94 opens port 95 and outside air is promptly drawn through tube 96 into the top of the container. The flow of lacquer to the feed hopper is resumed as the float rises and closes the port of the valve against further entrance of air. This action is intermittent until the container 66 is emptied.

Figure 12:
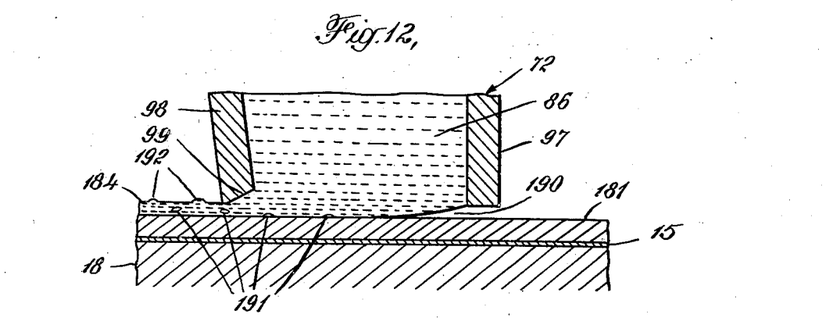
Fig. 12 is a sectional detail at the bottom of the feed hopper, showing how objectionable air may be entrapped while a disk is being coated.
Figure 13:
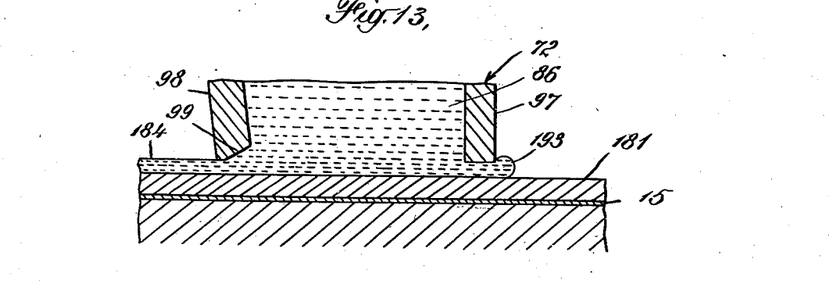
Fig. 13 is a sectional detail similar to Fig. 12, but showing how coating material may flow forward of the feed hopper and impair the coating on a disk.
Figure 14:
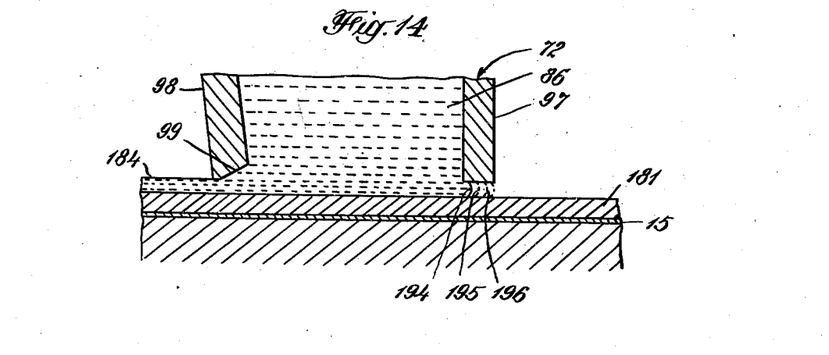
Fig. 14 is a sectional detail similar to Figs. 12 and 13, but showing the proper manner of spreading the coating material from the feed hopper onto the disks.

Referring to Figs. 12, 13 and 14, the construction of the bottom of the feed hopper is shown in greater detail. The discharge opening is rectangular in cross section. In addition to vertical end walls the hopper has a front wall 97 substantially vertical to the table 18. The rear wall 98 slopes so as to converge toward the bottom of the hopper; and its lower edge portion is shaped to form a doctor blade 99 as shown. For this purpose, the edge slopes upwardly into the interior of the hopper, in such a manner as to form an acute angle with the table 18.

Figure 6:
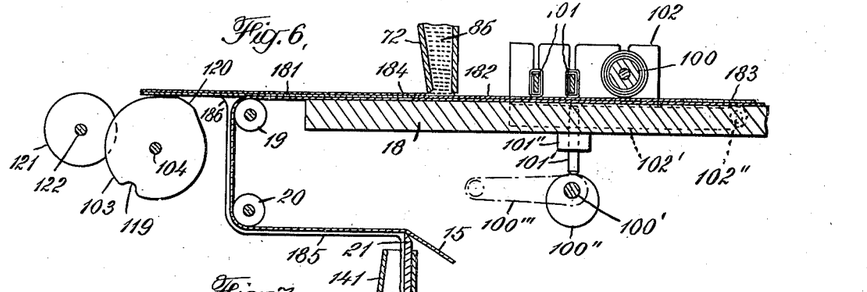
Fig. 6 is an enlarged sectional elevation of the disk separating means of Fig. 2, showing a coated disk about to be pulled forward.
Figure 9:
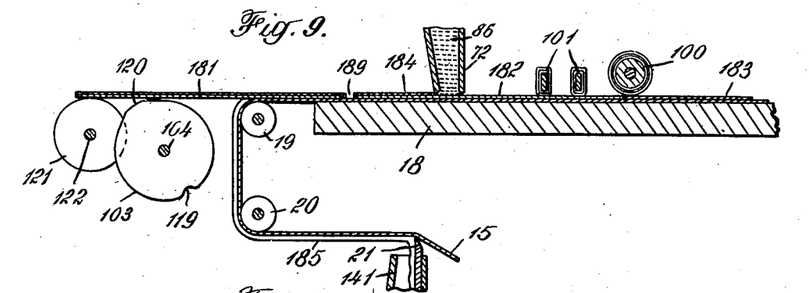
Fig. 9 is another enlarged sectional elevation of the disk separating means of Fig. 2, showing a coated disk after it has been pulled forward.

Referring particularly to Figs. 2, 6 and 9, the apparatus shown includes a cleaning and wiping mechanism comprising a roller 100 and one or more stationary wiping members 101 suitably fitted in a pair of movable notched brackets 102 attached to opposite sides of the table 18, immediately in front of the feed hopper. As shown more particularly in Fig. 6, the brackets 102 are supported by a pair of lateral arms 102' pivoted at 102". In order to raise the cleaners and wipers above the moving band, when desired or necessary, the apparatus shown comprises a shaft 100' appropriately supported to the frame 13. The shaft is provided with a pair of eccentric cams 100", and a lever 100'". A pair of plungers 101' is positioned directly above the cams, and extend vertically through a pair of sleeves 101" attached to the frame. By turning the lever, the brackets 102, and therefore the cleaners and wipers, may be raised above and lowered to the band. The roller and the wiping members are advantageously provided with an absorbent medium, such as linen, artificial silk and the like, which do not tend to give off lint while in use.

Still referring to Figs. 2, 6 and 9, the apparatus shown includes a coated disk removing mechanism comprising a pair of eccentric cams 103 positioned at the discharge end of and at substantially the same level as the table 18, and centrally thereof. The cams are provided with a shaft 104, the ends of which are adapted to fit into a pair of supports 105 having a series of spaced notches 106, as shown, each of which is intended for a given sized cam, the size of the cam in turn depending on the size of disk to be coated. The supports are in turn attached to a cross bar 107 extending across the rear of the machine, the ends of which are provided with a pair of vertical arms 108 suitably pivoted at 109 to the table. The vertical arms carry a pair of brackets 110 protruding laterally across the rear vertical members 111 of the frame. The brackets are in turn provided with a set screw 112 which is adapted to be screwed through the bracket against the frame so as to swing the supports 105 upwardly or downwardly to act as a leveling device for cams 103.

One end of the shaft 104 is provided with a pulley 115 equipped with an endless belt 116 extending around a roller 20, and having a depending loop portion fitted with a freely suspended pulley 117 to which a weight 118 is attached. The object of this weight is to form a friction drive and permits the registering or locating of a notch 119 in each cam 103; which, as will be shown below, is useful to the operator as a visual indicator, particularly when used in conjunction with a high spot 120 at the opposite side of notch 119 in each of the cams. The perimeter portion of the main portion of each cam travels at the same speed as the band, but the high spots 120 travel about 10% faster.

A roller 121, at substantially the same level as table 18, extends somewhat beyond the cams 103, and centrally thereof. This roller is mounted on a shaft 122 to one end of which is attached a pulley 123 provided with an endless belt 124 fitting around roller 19. The belt is provided with a loop at the lower portion of which is a freely suspended pulley 125 carrying a weight 126. The function of the weight is to make the belt serve as a friction drive. The shaft 122 is mounted at or near its center on a vertically disposed support 127 having a laterally extending arm which is adjustably attached to a plate 128 by means of a pair of set screws 129 extending through a slot 131 in the lateral arm. The plate 128 in turn rests on a cross member 132, the ends of which are provided with a pair of arms 133 pivoted at 134 to the frame members 111. The ends of the cross member are provided with a pair of set screws 135 bearing against a pair of brackets 136 protruding from the frame members 111. This construction permits adjustment of the roller 121 toward or away from the table 18, as well as upwardly or downwardly—to facilitate the removal of coated disks of various sizes from the band 15. The perimeter portion of the roller travels about 5% faster than the band.

In order to moisten the roller 100 it is advantageous to provide a special mechanism therefor (see Fig. 2). To this end the apparatus shown comprises a container 137 appropriately supported above the roller to uprights 67 by means of a bracket 138. A flexible tube 139 extends from the container to a position slightly above the roller, the lower end of the tube being provided with a valve 140. The tube may be moved crosswise of the roller to moisten it as desired.

The scraper blade 21 is mounted in a funnel 141. The funnel is in turn appropriately supported on the upright 67 by means of a cross bar 142. A suitable container 143 is placed under the funnel to catch coating lacquer 185 scraped from the paper band 15 by means of scraper blade 21.

Movement of the band 15 may be promptly terminated by disengaging the gears of driving rollers 22 and 23, by lifting lever 52; but it is also desirable to terminate the discharge of coating lacquer from the feed hopper 72 when movement of the band 15 is terminated. To this end (see Figs. 2 and 4), the structure includes means for dropping the bottom of the feed hopper squarely onto the band and the top of table 18; which is sufficient to prevent escape of the coating lacquer. The means include a cross bar 175 the ends of which are attached to the uprights 67 by a pair of brackets 176. A bearing 177 is secured to the top of the cross bar, centrally thereof; and is fitted with a crank 178, to one end of which an eccentric cam 179 is attached and suspended over a bracket 180 attached to the front wall of the feed hopper. The feed hopper may be dropped onto the band and table by turning the crank and hence the raised portions of the cam onto the bracket. This movement forces the lugs 75 on the feed hopper downwardly on the compression springs 77. To raise the hopper, the crank is again turned, compression on the springs is reduced, and they push upwardly on the lugs.

The above described apparatus may be employed as follows in the practice of the invention:

After the driving rollers 22 and 23 have been set into operation to propel the band 15 across the frame a plurality of blank disks 181, 182, 183, etc., are carefully and successively placed on the traveling band by the operator. In practice (see Figs. 6 and 7) these disks are preferably brought in point-to-point contact as they are laid on the band. The first disk moves under and is gripped by roller 100, where the top surface of the disk is subjected to the cleaning action of the solution with which the roller is moistened. In a presently preferred practice of the invention the roller is kept moist with alcohol, one of the solvents employed in the making of the coating lacquer. The alcohol is kept in container 137 and is fed onto the roller as needed. The alcohol functions to clean the top surface of the disk, particularly with respect to grease and similar impurities; and the alcohol likewise functions as a wetting agent for the disk and, thereby conditions its exposed surface for receiving the coating lacquer and having it adhere thereto without the objectionable formation of bubbles, which are injurious to the coated disk. The roller likewise functions to grip the blank disk and to hold it in position on the band and the disk moves toward and under the feed hopper 72.

In order to assure a perfectly clean surface on the disk, use is also made of the wipers 101. The disk is forced under and in contact with the wipers, which function to clean the top surface of the disk of dust and other foreign substances, while at the same time wiping off surplus alcohol deposited on the disk by roller 100.

As just noted, the roller grips and holds the disk in position as it moves under the feed hopper. This gripping action continues until the forward portion of the disk is well under the hopper and is subjected to the hydraulic pressure of the coating lacquer confined within the feed hopper. A sufficient amount of coating lacquer is maintained in the hopper to provide enough hydraulic pressure to flatten or straighten out small bends frequently found in the disks, so that they may receive an even coating of substantially uniform thickness.

By means of micrometric screws 78, the gap between the bottom of the feed hopper and the paper band is carefully calibrated to assure the desired thickness of coating on the disks. To assist in the formation of this coating of predetermined thickness, it is important that the lacquer be of homogeneous composition and that it have a suitable viscosity. The upper limit of viscosity must be such as to permit a slow flow of the lacquer to iron or smooth out small irregularities necessarily inherent in the process; while the lower limit of viscosity must be such as not to permit any appreciable flow of the lacquer out of the sides of the hopper or under the disks by capillary attraction, or counter to the direction of travel of the disk. If some of the lacquer should flow underneath the disk, it would unfit that side of the disk for coating.

As the disk passes under the hopper a sufficient amount of the lacquer is spread thereon to provide a coating 184 having a thickness substantially the depth of the gap between the top of the blank disk and the bottom of the hopper or doctor blade 99. The outside of the rear wall 98 of the hopper is maintained free of lacquer as the coated disk emerges from under the hopper, so as not to impair the evenness of coating due to creeping of lacquer up the wall. It is customary for the operator, if necessary, to scrape that part of the wall clear of lacquer before a disk is passed under the hopper.

Figs. 12 and 13 illustrate wrong methods and Fig. 14 illustrates a proper method of coating the disks. Thus, in Fig. 12, the coating lacquer 86 is shown dropping onto a disk from the feed hopper in such a manner as to leave a wedge-like gap 190 which entraps air that becomes occluded in the coating as air bubbles 191. Some of these bubbles rise to the surface and form pimples or berries 192 on the surface of the coated disk, which of course impair the disk for sound recordation and reproduction purposes. This objectionable result is in large part due to a too rapid passage of the disk under the hopper, the use of lacquer too viscous for the speed of travel of the disc, or, generally, to insufficient wetting of the disk surface with alcohol.

Fig. 13 on the other hand, illustrates what happens when the surface of the disk is excessively wetted with alcohol, or when the lacquer is too thin, or when the disk does not pass under the feed hopper rapidly enough. The lacquer 86 hits the wetted surface of the disk, spreads instantaneously and runs forward of the feed hopper, extending forward of the front wall 97 to form an overflow mass 193 of lacquer, which builds up on the outside of the wall; and this tends to produce stringiness or unevenness of the coating on the disk. It is for this reason that the operator keeps the outside surface of the wall scraped clean of lacquer, as shown in Fig. 14.

Fig. 14 illustrates a proper method of coating disks. In this case, the lacquer tends to flow toward the front of the feed hopper, but only proceeds to a convenient point under the front wall 97, such as indicated by the numerals 194, 195, 196, etc. When this occurs, air is not entrapped in the lacquer on the disk, and the lacquer does not of course escape to the front of the feed hopper. This happy result is obtained when the surface of the disk is properly wetted, and where the viscosity of the lacquer and the speed of travel of the disk under the hopper are properly correlated.

As will be clear from the drawings, the band is wider than the disks and thereby provides a substantial amount of uncovered band immediately surrounding each disk resting thereon. The band and disks are passed horizontally at a uniform and steady rate of speed, under the hopper while the disks are maintained at a predetermined and uniform distance from the bottom of the hopper of doctor blade. The coating lacquer is steadily discharged from the hopper as the disks pass thereunder. As indicated above, the viscosity and the amount of lacquer discharged from the hopper and the speed of the band are such as to fill completely the gap between the disks and the bottom of the hopper, so that a coating of substantially the thickness of the gap is evenly spread across the top surface of each disk as it leaves the hopper; while the portion of the band immediately surrounding each disk is given a coating 185 having a thickness substantially equal to the combined thickness of the blank disk and its coating. As the coated disk emerges from under the hopper, the coating flows sufficiently to even out minute irregularities on the surface.

The coated disk is appropriately separated from the coated portion of the band at its discharge end. For this purpose (see Figs. 6, 7, 8, 9, 10 and 11), the band is passed downwardly over roller 19 at its discharge end while the forward portion of the coated but embedded disk continues and is projected at the discharge end in a horizontal direction, away from the downwardly moving portion of the band; so that the coating 185 on that part of the band is automatically and progressively severed or sheared from the coating 184 around the forward perimeter portion of the disk. The shearing action between the coating on the band and the coating along the perimeter of the disk starts at the foremost part of the disk, where the band first parts with the disk, and proceeds rearwardly and outwardly along both sides of the disk. This cutting movement continues until the first half of the coated disk passes over the roller 19.

Figure 7:
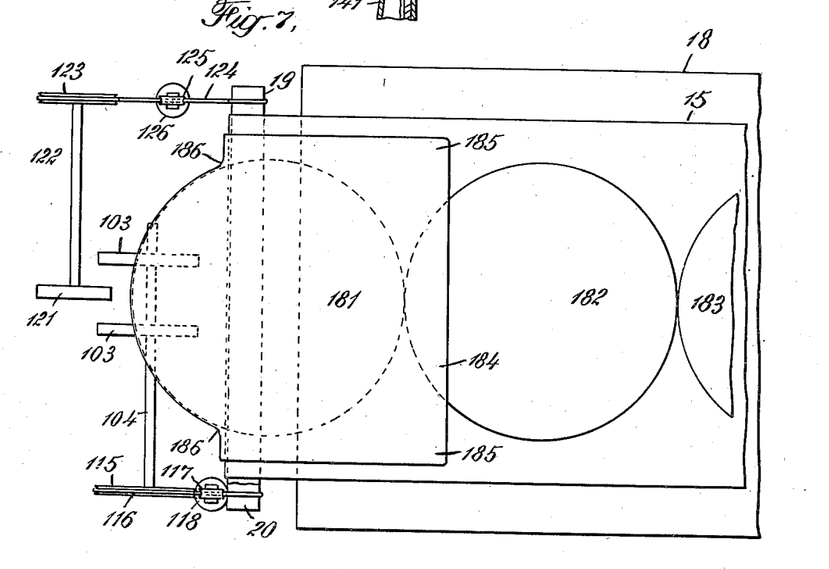
Fig. 7 is a plan view of Fig. 6.
Figure 8:
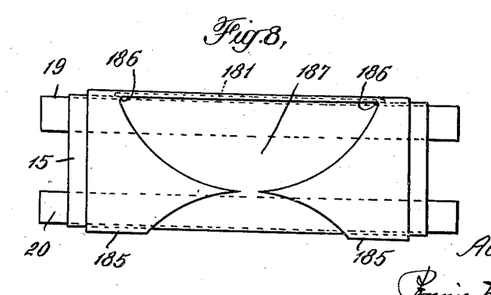
Fig. 8 is an enlarged end elevation in part of Figs. 6 and 7.

The shearing action is more particularly illustrated in Figs. 6, 7 and 8. The coating along the perimeter of the disk parts from the coating on the band at point 186 directly at the perimeter of the disk. It is imperative that this shearing action be sharp, uniform, and complete; and that it take place at the perimeter, and not appreciably inside or outside of the perimeter of the disk. If the shearing action should take place inside the perimeter, coating lacquer would of course be removed from the face of the disk and thus render it useless. If the shearing action should take place outside of the perimeter of the disk, strings or shreds of lacquer would dangle from the edge of the disk and tend to swing or flow around the edge and adhere to the bottom of the disk, and thus build up an incrustation of lacquer that would totally unfit that side of the disk for further use. If the under side of the disk had not previously been coated, the incrustations would make an even and uniform coating impossible; and, if it had been previously coated, that side of the disk would of course be rendered useless.

Referring to Fig. 8, the first disk 181 in the series is shown with almost its first half portion completely separated from the band, thus leaving a clean, uncoated almost semi-circular surface area 187 on the band where that part of the disk had formerly rested. The band coating 185 continues to adhere to the band and surrounds the semi-circular clean portion 187 of the band.

When almost the first half of the coated disk passes over roller 19, and the coating on almost the first half of the disk has been sheared along its perimeter, the high spots 120 of the cams 133 strike and frictionally grip the inside of the forward portion of the disk, and, because the peripheral portions of that part of the cams travel at a greater speed than the remaining portion of the cam, the coated disk is slightly lifted at its forward portion and the whole disk is suddenly pulled forward an appropriate distance 189 from the next disk 182 in the series. When this occurs, the coating 184 on the disk is severed along its perimeter from the coating 185 on the band. This severing action extends around approximately the rear half of the disk 181.

Figure 10:
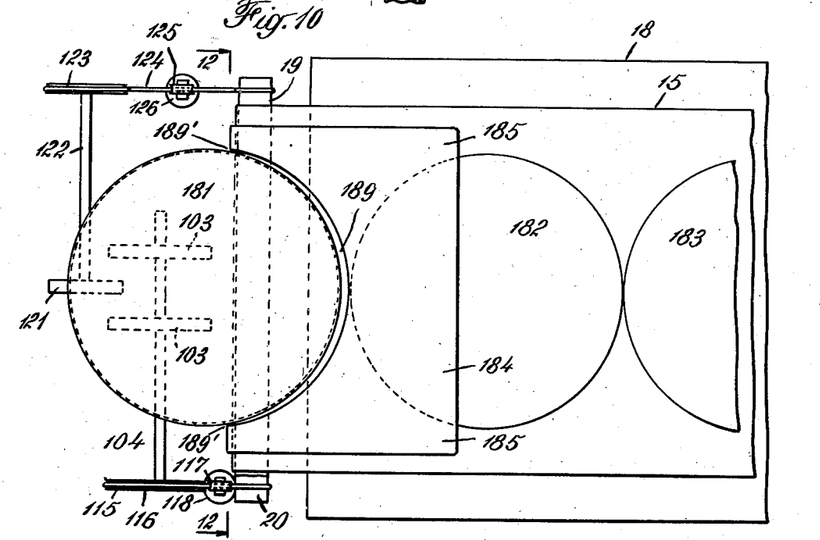
Fig. 10 is a plan view of Fig. 9.
Figure 11:
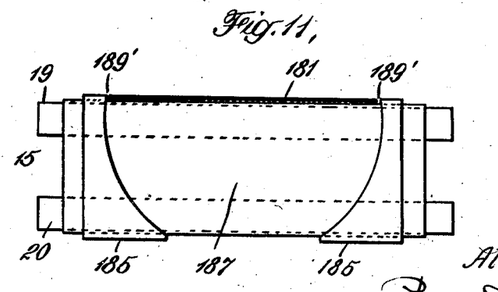
Fig. 11 is an enlarged end elevation in part on the line 11—11 of Fig. 10.

After the initial pull on the coated disk by the high spots 120 of the cams 103, the forward portion of the coated disk reaches and is deposited on roller 121; thus providing in conjunction with the band an adequate support for the coated disk as it leaves the band. When the high spots carry the coated disk forward, a narrow open space 189' is created at both sides of the disk between its perimeter and the coating 185 on the band, where the disk and band separate above the roller 19. After the coated disk strikes roller 121, the disk is propelled forward more rapidly than the speed of the band, which action widens the gap 189-189' as the disk continues to leave the band and thus reduces the chance of coating material seeping between the disk and band.

The coated band, after the coated disks are removed, passes downwardly over rollers 19 and 20, laterally under the table across scraped blade 21, and between driving rollers 22 and 23 to take-up roll 24. Substantially all of the coating material is scraped from the band and drops through funnel 141 into hopper 143; from which it is removed and re-used to coat disks.

The operator should exercise care in removing the coated disks from the top of roller 121 and cams 103 so as not to impair their freshly coated surfaces. This may be done by lifting each coated disk from its underside and gently depositing it onto the raised contacts 174 at the top of one of the vertical supports 173 on the flat bar 172 on which they are conveyed through the drying tunnel. A supply of these bars is kept at hand, and they are placed on the endless conveyor 144 one by one, as needed.

Referring to Fig. 1, the bar 172 is shown as supporting three coated disks, for example, 181, 182 and 183, on the endless conveyor 144 in the drying tunnel 12. If both coating machines 10 and 11 are simultaneously operated, the coated disks from each are transferred in this manner for drying. One or the other coating machine may be used alone in conjunction with the drying tunnel. Whether one or two coating machines are used, the speed of the coating machine or machines and the drying tunnel are synchronized so that the drying tunnel may take care of the coated disks as rapidly as they are transferred.

By the time the coated disks have traveled from the charging to the discharging end of the drying tunnel, the coating thereon is fairly well set and hardened; at least to the point at which the coated disks may be more readily handled without fear of impairing the evenness of their coating. In a present practice, the coated disks are removed from the discharging end of the drying tunnel and placed in racks (not shown) to keep the coated disks out of contact with one another; and the loaded racks are then placed in a drying chamber (not shown) where they are permitted to stand until sufficiently dried out. If the disks have been coated only on one side, they are then returned to the coating machine to have their other side coated, in the same manner as above described; after which they are subjected to a similar drying operation in the drying tunnel.

This application is a continuation-in-part of my copending application Serial No. 288,916, filed August 8, 1939.

I claim:

1. The method of manufacturing phonographic disks which comprises placing a succession of blank disks on a substantially imperforate band wider than the disks so as to provide a substantial amount of uncovered band immediately surrounding each disk resting thereon, passing the band and disks in a generally horizontal direction at a substantially uniform and steady rate of speed under a lacquer-feeding hopper extending laterally across the disks and at least over a portion of the uncovered band beyond both sides of each disk, depositing a coating of the lacquer from the hopper onto the disks and surrounding portions of the band as the disks pass under the hopper, moving the coated portion of the band with the disks embedded in the coating material thereon a distance sufficient to clear the hopper, and then separating the coated disks from the coated portion of the band by passing the band at its discharge end away from the discs and projecting the forward portion of each coated disk at the discharge end in the same general direction in which the disk had been moving away from the band so that the coating on that part of the band automatically and progressively is severed from the coating around the forward perimeter portion of the disc, said severing action between the coating on the band and the coating along the perimeter of the disk starting at the foremost part of the disk where the band first parts with the disk and proceeding rearwardly along both sides of the disk as the band continues to part with the disk, pulling the disk forward at a speed somewhat greater than the speed of the traveling band after at least the forward half of the disk has been separated from the band to separate the rear perimeter portion of the coated disk from the coating on the band immediately adjacent thereto, and thereafter completing the separation of the disk from the traveling band.

2. The method of manufacturing phonographic disks which comprises placing a succession of blank disks on a substantially imperforate band wider than the disks so as to provide a substantial amount of uncovered band immediately surrounding each disk resting thereon, passing the band and disks in a generally horizontal direction at a substantially uniform and steady rate of speed under a lacquer-feeding hopper extending laterally across the disks and at least over a portion of the uncovered band beyond both sides of each disc, depositing a coating of the lacquer from the hopper onto the disks and surounging portions of the band as the disks pass under the hopper, moving the coated portion of the band with the disks embedded in the coating material thereon a distance sufficient to clear the hopper, and then separating the coated disks from the coated portion of the band by passing the band downwardly at its discharge end and projecting the forward portion of each coated disk at the discharge end in a generally horizontal direction away from the downwardly moving portion of the band so that the coating on that part of the band automatically and progressively is severed from the coating around the forward perimeter portion of the disk, said severing action between the coating on the band and the coating along the perimeter of the disk starting at the foremost part of the disk where the band first parts with the disk and proceeding rearwardly along both sides of the disk as the band continues to part with the disk, frictionally gripping the undersurface of the projecting portion of the coated disk and pulling it forward at a speed somewhat greater than the speed of the traveling band after at least the forward half of the disk has been separated from the band to separate the rear perimeter portion of the coated disk from the coating on the band immediately adjacent thereto, and thereafter completing the separation of the disk from the traveling band.

3. The method of manufacturing phonographic disks which comprises placing a succession of blank disks on a substantially imperforate band wider than the disks so as to provide a substantial amount of uncovered band immediately surrounding each disk resting thereon, passing the band and disks in a generally horizontal direction at a substantially uniform and steady rate of speed under a lacquer-feeding hopper extending laterally across the disks and at least over a portion of the uncovered band beyond both sides of each disk, maintaining the disks at a predetermined and uniform distance from the bottom of the hopper as they pass thereunder, depositing a coating of the lacquer from the hopper onto the disks and surrounding portions of the band as the disks pass under the hopper, the speed of travel of the disks beneath the hopper being so correlated to the viscosity and the amount of lacquer discharged from the hopper that the gap between the disks and the bottom of the hopper is substantially completely filled without flowing out of the side of the hopper counter to the direction of travel of the disks and without air being entrapped in the lacquer applied to the disks, so that a coating of substantially the thickness of the gap is spread evenly across the top surface of each disk as it leaves the hopper while the portion of the band immediately surrounding each disk is coated by a thickness substantially equal to that of the blank disk and its coating, moving the coated portion of the band with the disks embedded in the coating material thereon a distance sufficient to clear the hopper, and then separating the coated disks from the coated portion of the band by passing the band at its discharge end away from the discs and projecting the forward portion of each coated disk at the discharge end in the same general direction in which the disk had been moving away from the band so that the coating on that part of the band automatically and progressively is severed from the coating around the forward perimeter portion of the disk, said severing action between the coating on the band and the coating along the perimeter of the disk starting at the foremost part of the disk where the band first parts with the disk and proceeding rearwardly along both sides of the disk as the band continues to part with the disk, pulling the disk forward at a speed somewhat greater than the speed of the traveling band after at least the forward half of the disk has been separated from the band to separate the rear perimeter portion of the coated disk from the coating on the band immediately adjacent thereto, and thereafter completing the separation of the disk from the traveling band.

4. The method of manufacturing flexible phonographic disks which comprises placing a succession of blank disks on a substantially imperforate band wider than the disks so as to provide a substantial amount of uncovered band immediately surrounding each disk resting thereon, passing the band and disks in a generally horizontal direction at a substantially uniform and steady rate of speed under a lacquer-feeding hopper extending laterally across the disks and at least over a portion of the uncovered band beyond both sides of each disk, maintaining the band at a predetermined and uniform distance from the bottom of the hopper as it passes thereunder, depositing a coating of the lacquer from the hopper onto the disks and surrounding portions of the band as the disks pass under the hopper, maintaining in the hopper a substantially constant supply of lacquer sufficient in amount to provide enough hydraulic pressure to flatten slight bends in the disks and to press the disks tightly against the band as they travel under the hopper, so that an even coating substantially the thickness of the width of the gap between the bottom of the hopper and the disks is spread across the top surface of each disk as it emerges from under the hopper, moving the coated portion of the band with the disks embedded in the coating material thereon a distance sufficient to clear the hopper, and then separating the coated disks from the coated portion of the band.

5. The method of manufacturing flexible phonographic disks which comprises placing a succession of blank disks on a substantially imperforate band wider than the disks so as to provide a substantial amount of uncovered band immediately surrounding each disk resting thereon, passing the band and disks in a generally horizontal direction at a substantially uniform and steady rate of speed under a lacquer-feeding hopper extending laterally across the disks and at least over a portion of the uncovered band beyond both sides of each disk, maintaining the band at a predetermined and uniform distance from the bottom of the hopper as it passes thereunder, depositing a coating of the lacquer from the hopper onto the disks and surrounding portions of the band as the disks pass under the hopper, maintaining in the hopper a substantially constant supply of lacquer sufficient in amount to provide enough hydraulic pressure to flatten slight bends in the disks and to press the disks tightly against the band as they travel under the hopper, so that an even coating substantially the thickness of the width of the gap between the bottom of the hopper and the disks is spread across the top surface of each disk as it emerges from under the hopper, moving the coated portion of the band with the disks embedded in the coating material thereon a distance sufficient to clear the hopper, and then seprating the coated disks from the coated portion of the band by passing the band at its discharge end away from the disks and projecting the forward portion of each coated disk at the discharge end in the same general direction in which the disk had been moving away from the band so that the coating on that part of the band automatically and progressively is severed from the coating around the forward perimeter portion of the disk, said severing action between the coating on the band and the coating along the perimeter of the disk starting at the foremost part of the disk where the band first parts with the disk and proceeding rearwardly along both sides of the disk as the band continues to part with the disk, pulling the disk forward at a speed somewhat greater than the speed of the traveling band after at least the forward half of the disk has been separated from the band to separate the rear perimeter portion of the coated disk from the coating on the band immediately adjacent thereto, and thereafter completing the separation of the disk from the traveling band.

ALBERT B. ST. HILAIRE.